(12) United States Patent
Fregnan

(10) Patent No.: US 10,292,526 B2
(45) Date of Patent: May 21, 2019

(54) PROFESSIONAL COFFEE MACHINE

(71) Applicant: Elektra S.r.l., Casier (Treviso) (IT)

(72) Inventor: Andrea Fregnan, Casier (IT)

( * ) Notice: Subject to any disclaimer, the term of this patent is extended or adjusted under 35 U.S.C. 154(b) by 0 days.

(21) Appl. No.: 15/763,083

(22) PCT Filed: Oct. 20, 2016

(86) PCT No.: PCT/IB2016/056308
§ 371 (c)(1),
(2) Date: Mar. 23, 2018

(87) PCT Pub. No.: WO2017/068522
PCT Pub. Date: Apr. 27, 2017

(65) Prior Publication Data
US 2018/0213969 A1 Aug. 2, 2018

(30) Foreign Application Priority Data
Oct. 21, 2015 (IT) .............................. UB2015A5131

(51) Int. Cl.
*A47J 31/057* (2006.01)
*A47J 31/30* (2006.01)
(Continued)

(52) U.S. Cl.
CPC ........... *A47J 31/542* (2013.01); *A47J 31/007* (2013.01); *A47J 31/0576* (2013.01);
(Continued)

(58) Field of Classification Search
CPC .. A47J 31/007; A47J 31/0573; A47J 31/0576; A47J 31/0626; A47J 31/0657; A47J 31/0663; A47J 31/30; A47J 31/34
(Continued)

(56) References Cited

U.S. PATENT DOCUMENTS 5,259,297 A * 11/1993 Giuliano ............... A47J 31/007
99/282
5,813,318 A * 9/1998 Zanin .................... A47J 31/007
99/291
(Continued)

FOREIGN PATENT DOCUMENTS

| CN | 101677716 | 3/2010 |
| FR | 2907649 | 5/2008 |

(Continued)

*Primary Examiner* — Reginald Alexander
(74) *Attorney, Agent, or Firm* — Themis Law

(57) ABSTRACT

A professional coffee machine includes a supporting frame; a boiler; a preheater to prepare a coffee infusion having a first heat exchanger with the boiler to heat the supply water crossing the first exchanger to a first temperature $T_1$ close or substantially equal to a second temperature $T_2$ corresponding to the optimal temperature for a coffee infusion; a dispensing unit of the coffee infusion having a thermo-controlled heating element that brings the water released from the preheater to the second temperature $T_2$ if $T_1$ is lower than $T_2$; a thermal insulator that mechanically constrains the dispensing unit to the frame; a heater for preparing a tea infusion or the like having a second heat exchanger with the boiler to heat the supply water crossing the second heat exchanger up to a third temperature $T_3$ corresponding to the optimal temperature for preparing a tea infusion or the like.

16 Claims, 5 Drawing Sheets

Figure 1:
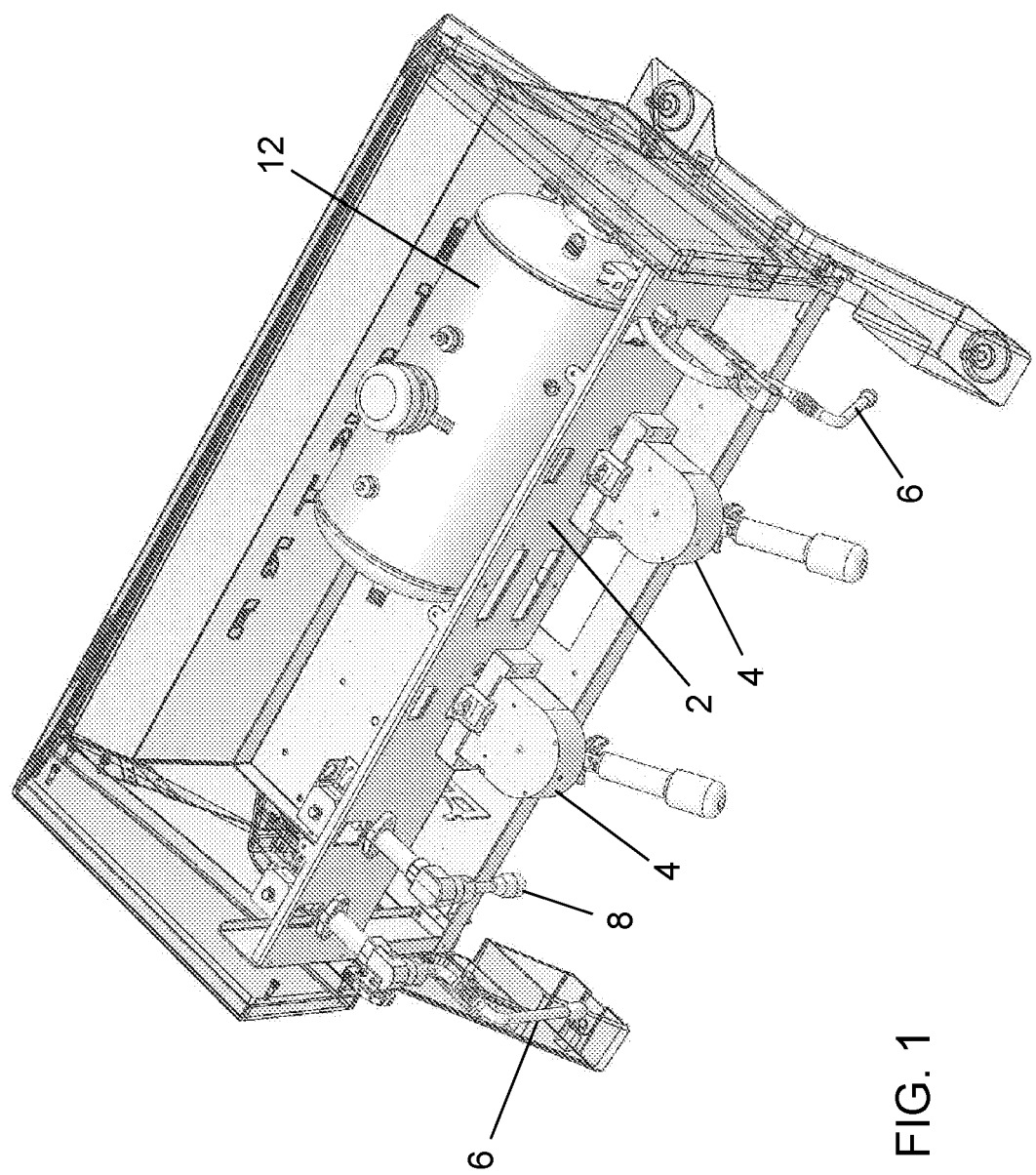

(51) Int. Cl.
  *A47J 31/54* (2006.01)
  *A47J 31/00* (2006.01)
  *A47J 31/44* (2006.01)
  *A47J 31/46* (2006.01)
  *A47J 31/06* (2006.01)

(52) U.S. Cl.
  CPC ....... *A47J 31/4403* (2013.01); *A47J 31/4485* (2013.01); *A47J 31/4489* (2013.01); *A47J 31/46* (2013.01); *A47J 31/465* (2013.01); *A47J 31/0657* (2013.01); *A47J 31/30* (2013.01)

(58) Field of Classification Search
  USPC ............................................... 99/302 R, 293
  See application file for complete search history.

(56) References Cited

U.S. PATENT DOCUMENTS

| | | | | |
|---|---|---|---|---|
| 7,814,824 B2* | 10/2010 | Beretta | ................ | A47J 31/56 426/433 |
| 8,215,229 B2* | 7/2012 | Faccinti | ................ | A47J 31/36 99/280 |
| 8,505,441 B2* | 8/2013 | Bambi | ................ | A47J 31/002 99/283 |
| 8,661,967 B2* | 3/2014 | Gonen | ................ | A47J 31/36 99/281 |
| 2003/0066430 A1* | 4/2003 | Bitar | ................ | A47J 31/36 99/275 |
| 2006/0107839 A1* | 5/2006 | Nenov | ................ | A47J 31/36 99/275 |
| 2009/0308255 A1* | 12/2009 | Coccia | ................ | A47J 31/465 99/281 |
| 2011/0252976 A1* | 10/2011 | Liu | ................ | A47J 31/002 99/288 |

FOREIGN PATENT DOCUMENTS

| | | |
|---|---|---|
| WO | 9107898 | 6/1991 |
| WO | 0245559 | 6/2002 |

* cited by examiner

PROFESSIONAL COFFEE MACHINE

The present invention relates to a professional coffee machine.

Coffee machines are known, which are intended to be used in coffee shops for the production of increased quantities of coffee, tea and similar infusions, cappuccinos and other hot beverages.

A coffee machine for professional use is to be capable of meeting increased stresses due to intense use. In particular, a professional coffee machine, intended for example to be used in a coffee shop, is to be capable of preparing a few hundred, and even thousand, coffees every day, and of processing even 200 liters of milk a day, and this for several years.

Any professional coffee machine comprises a frame, to which a boiler is mounted for the production of hot water and pressurized steam generally at a temperature of 122° C. and a pressure of 1.2 bar.

The boiler is supplied with supply water and is provided with a first outlet, which crosses a solenoid valve or manual tap, which is supplied by a first spout for dispensing hot water for the preparation of tea and other infusions. The boiler is also provided with a second outlet which crosses another solenoid valve or another manual tap which is supplied by a second dispensing spout of a steam flow for heating the milk and/or foaming.

After a significant quantity of hot water has been taken from the boiler to prepare a tea infusion or a coffee infusion, new cold water enters the boiler and induces a sudden cooling of the water therein with the subsequent alteration of the optimal conditions of use of the coffee machine for the whole time required to restore operating conditions.

Traditional professional coffee machines again are designed for each coffee dispensing unit of a heat exchanger accommodated in the boiler and intended to heat the water for the preparation of espresso coffee. It is supplied with supply water which is pressurized by a pump, and is sized so as to provide exiting water at 82-85° C., which is introduced into the dispensing unit fastened to the machine frame and provided with quick coupling and uncoupling means of a traditional filter holder.

If the features of a professional coffee machine are well known and the operating method thereof is just as known, what diversifies one coffee machine from another is its performance. It is associated with specific conditions of use, which in turn subject the coffee machine to significant stresses in the use thereof, and it is associated with the needs resulting from the uses and different habits from one country to the next.

For example, according to the types of coffee, these require a different grinding particle size and this affects also the temperature and pressure values of the infusion water, which in turn affect the flavor, color and aroma of the coffee infusion. And since coffee is the basic ingredient for a series of different beverages (espresso coffee, coffee with milk, cappuccino, etc.), it is easy to understand that the preparation of a coffee with constant and repeatable organoleptic features for any type of blend is not a problem which is easily solved.

Another problem with traditional professional coffee machines is the need to generate superheated steam in such quantities so as to be able to heat large quantities of milk, as requested in certain countries (U.S.A., Germany, Australia). This results in the quantity of cold water which enters the boiler for restoring that released as pressurized steam for heating the milk, cooling the water in the boiler and indirectly the hot water which is released from the exchanger for the preparation of the coffee infusion, with the drawbacks indicated above.

Moreover, known professional coffee machines are to also meet the needs encountered in the different countries and which often are contrasting in nature. If indeed the preparation of increased daily quantities of milk is required, there is a need to have high pressure steam available, while if a little milk is to be frothed, there is a need to make low pressure and low flow steam available.

Another problem with known professional coffee machines is that the hot water to be used for the preparation of the tea infusion and the like is the same boiler water which generates the pressurized steam for heating and frothing the milk. However, when the water is released from the dispenser, it has a greater pressure and higher temperature than the ambient ones and it is not suitable for preparing tea and other infusions.

Another problem with known professional coffee machines and associated with needs of contrasting nature consists in the need on the one hand to have a large thermal inertia of the machine in order to absorb the temperature variations of the water associated with the continuous dispensing of hot water and with its restoration with cold water, and on the other hand the need to have a low thermal inertia to obtain a prompt response of the machine to the temperature adjustment system.

EP 1886605 describes a professional coffee machine comprising a unit for dispensing the coffee which is provided with a preheating chamber, a first heater for heating the supply water provided for the preparation of the coffee infusion, and a second heater, which is independent from the first, for heating the supply water to then be sent to the unit for the generation of steam. In particular, the latter comprises a series of heating modules which heat in sequence the water flow from the second heater of the unit for dispensing the coffee up to brining it completely to the status of steam. Moreover, the steam thus obtained is dispensed directly externally by means of a dispenser or is sent to a device which, due to the Venturi effect, draws the cold water in the supply tank. In greater detail, the cold water thus drawn is hit by the aforesaid hot flow of steam and thereby is heated.

The machine of EP 1886605 does not include any boiler consisting of a tank which is filled with supply water and which is provided with means for heating said supply water.

EP 2133011 instead describes a professional machine, exclusively for the preparation of coffee. In particular, such a machine comprises a boiler which receives the cold supply water and a circuit in which the cold supply water is conveniently mixed with the heated water released from the boiler so as to cause them to reach a first temperature. The water at such a first temperature then is sent to a dispensing unit comprising a heater which is configured to take the water to a second temperature corresponding to the optimal one for dispensing the coffee infusion.

The machine of EP 2133011 is not intended in any manner for the generation of hot water and does not include the presence of a heater and dispenser of hot water for the preparation of the infusion tea.

WO 2011/145064 describes a coffee machine for household use which is not suitable for increased productions of coffee, tea or milk. In particular, since it is not a professional machine, it has completely different needs. In greater detail, the machine according to WO 2011/145064 comprises a tank for the water which is sent, by means of a pump, to a first heater where it is heated to generate hot water to be used for the preparation of the coffee infusion. Furthermore, the water already heated by the first exchanger, or directly the water not heated by the tank, is sent to a second heater for generating steam to be sent to a corresponding dispensing spout. In particular, the second heater does not comprise a tank in which the water is balanced with the steam, and this leads to the deduction that it is configured for the instantaneous generation of low flow steam. However, such a type of steam generation is incompatible with professional needs, in which increased productions of steam are required, also in particularly close succession.

The machine according to WO 2011/145064 is not intended in any manner for the generation of hot water and does not include the presence of a heater and dispenser of hot water for the preparation of the infusion tea.

It is the object of the invention to provide a professional coffee machine capable of resolving all the above problems, also contrasting in nature, which are encountered in current professional coffee machines.

It is another object of the invention to provide a professional coffee machine in which maintaining the optimal temperature of the hot water for the preparation of the coffee infusion is ensured.

It is another object of the invention to provide a professional coffee machine capable of quickly responding to the hot water temperature adjustment system for the preparation of the coffee infusion.

It is another object of the invention to provide a professional coffee machine which simultaneously allows both a fine-tuned and quick adjustment of the temperature of the water to be used for the coffee infusion, the dispensing of pressurized steam for heating/frothing the milk, and the dispensing of hot water at the temperature desired for the preparation of the tea infusion and the like.

It is another object of the invention to provide a professional coffee machine in which various pressures and steam flows to the dispensers may be used without affecting the ability to maintain the optimal temperature for the preparation of the coffee infusion.

It is another object of the invention to provide a professional coffee machine capable of generating hot water for the preparation of the tea infusion and the like, at the proper temperature required for that specific use, without affecting the ability to maintain the optimal temperature of the water for the preparation of the coffee infusion.

It is another object of the invention to provide a professional coffee machine which has an alternative characterization with respect to traditional ones, both in terms of construction and performance.

It is another object of the invention to provide a professional coffee machine which can be obtained in a simple, quick manner and with low costs.

All these objects, both individually and in any combination thereof, and other objects which will become apparent from the description below, are achieved according to the invention by a professional coffee machine as defined in claim 1.

Figure 2:
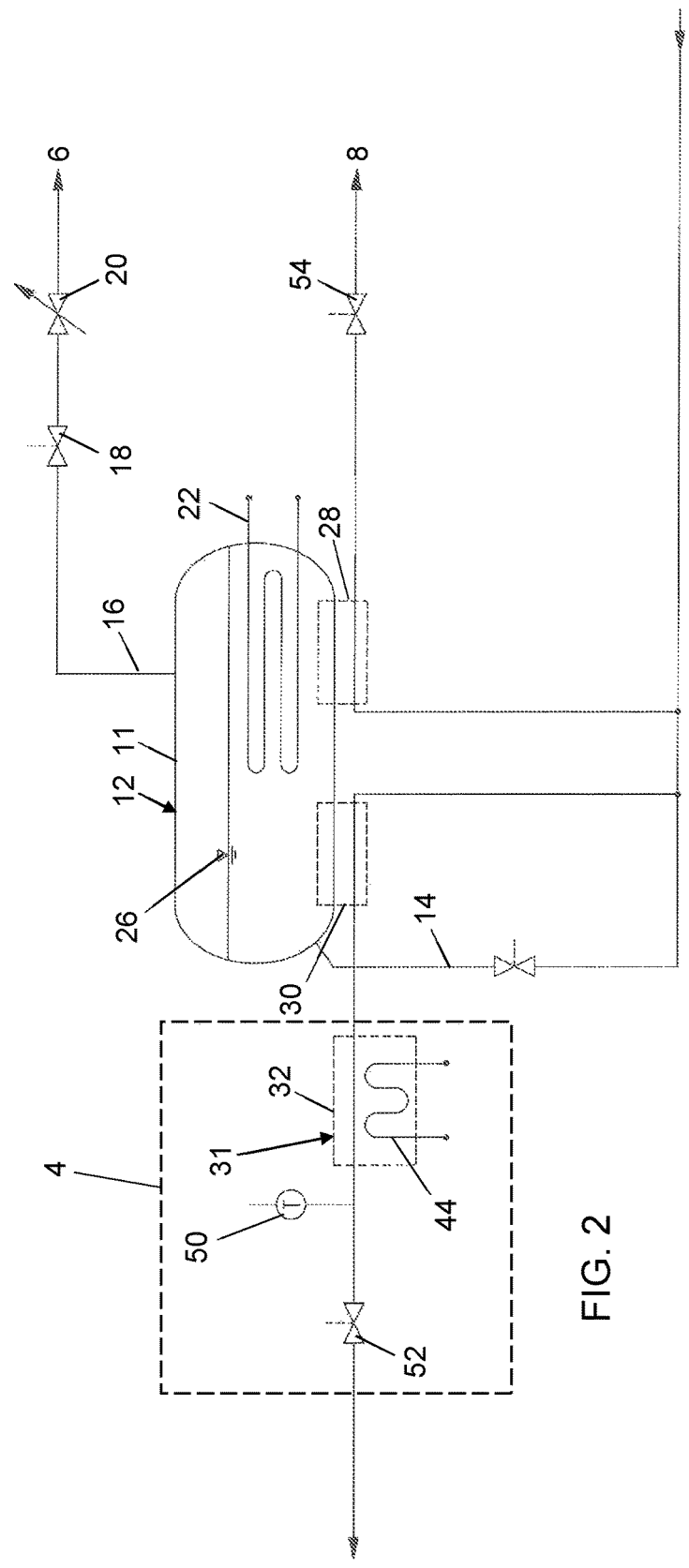
Figure 3:
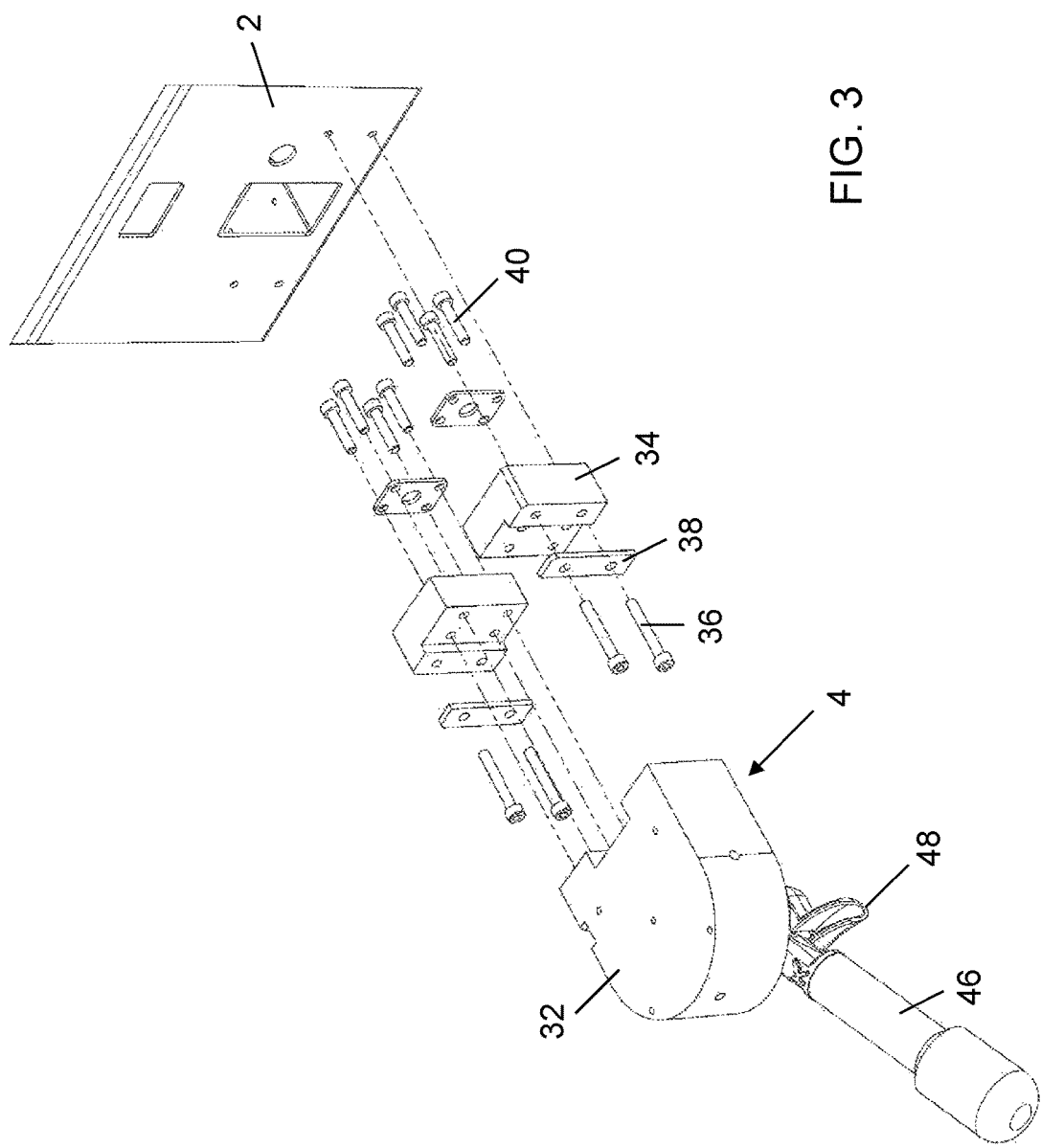
Figure 4:
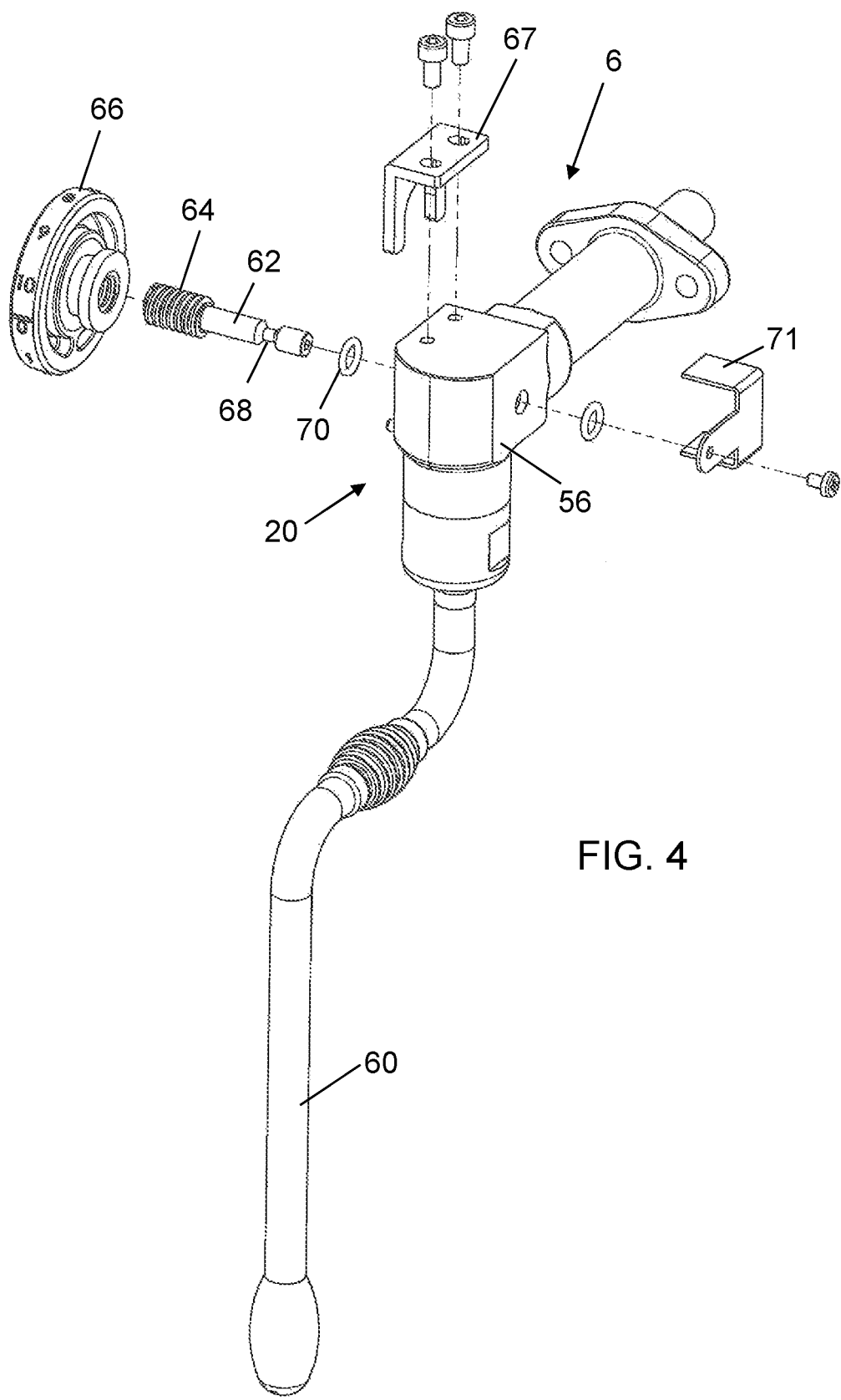
Figure 5:
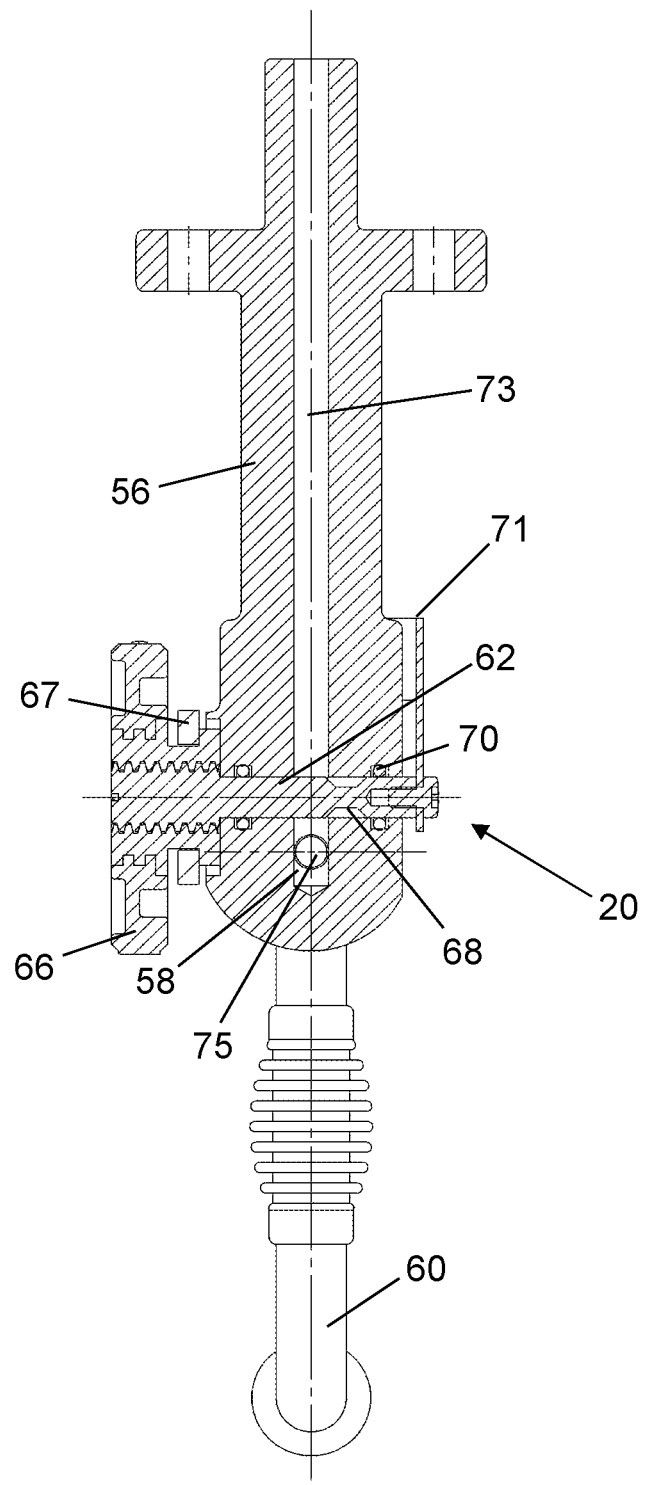

The present invention is hereinbelow further clarified in a preferred embodiment thereof, which is described by mere way of non-limiting example, with reference to the accompanying drawings, in which:

FIG. 1 shows a perspective and general view of a professional coffee machine according to the invention, FIG. 2 shows the simplified hydraulic diagram thereof, FIG. 3 shows an exploded perspective view of a dispensing unit and the methods for constraining it to the coffee machine frame, FIG. 4 shows an exploded perspective view of the pressurized steam dispenser, and FIG. 5 shows the horizontal section of the pressurized steam dispenser.

As shown in the drawings, the professional coffee machine is similar externally to traditional coffee machines, i.e. it has a frame 2 to which all the functional components of the machine are applied, which are referred to, insofar as useful to the comprehension of the present invention, during the course of the description below.

Hereinbelow, "professional coffee machine" means a coffee machine intended to be subjected to intense use, i.e. to be capable of preparing a few hundred, and even thousand, coffees every day, and of processing even 200 liters of milk a day, and this in a particularly quick manner, without requiring stop times between successive preparations, and for several years.

The dispensing units 4 of the coffee infusions, the dispensers 6 of pressurized steam for heating and frothing the milk and a dispenser 8 of hot water for the preparation of the tea and other infusions in particular are fastened to frame 2 of the machine. An outer body 10, which protects and conceals all functional internal machine components from sight, is applied to frame 2.

A boiler 12 is mounted to frame 2, which boiler comprises a tank 11 having a capacity of at least 8 liters and is provided with an inlet 14 of the cold supply water and an outlet 16 for pressurized steam. Advantageously, the hot water (liquid component) inside the tank 11 of boiler 12 is balanced with the superheated steam (gaseous component).

The outlet 16 for pressurized steam puts the upper inner space of the tank 11 of boiler 12, which is occupied by the steam, in communication with the steam dispenser 6 through a solenoid valve 18 and a fine flow regulator 20, the details of which are described below.

Boiler 12 is provided with traditional heating means of the water contained in its tank 11, and these preferably consist of an electrical resistance 22, even though they could consist of other means, e.g. a gas burner or other.

Boiler 12 is also provided with traditional control members, such as in particular a thermal probe, which detects the temperature of the water inside its tank 11, and a level sensor 26 of the water itself.

Finally, boiler 12 is fastened to frame 2 of the coffee machine by means of blocks made of thermal insulating material (not shown), which serve the function of avoiding the formation of heat bridges between the boiler itself and frame 2 and accordingly, between the boiler itself and the parts of machine fastened to frame 2.

Two heat exchangers 28 and 30 are associated with boiler 12, which are supplied at inlet with the cold supply water and are connected at the outlet to the dispenser 8 of hot water for the preparation of the tea and other infusions, and with the dispensing unit 4 of the coffee infusion, respectively. In particular, the water in the tank 11 of boiler 12 acts as a heat-carrying fluid for the heat exchangers 28 and 20. In greater detail, the water which crosses the heat exchangers 28 and 30 heats up, thus absorbing the heat which is transferred by the water in the tank 11 of boiler 12.

Advantageously, as will be more apparent below, exchanger 30 in reality acts as a preheater for the water intended to prepare the coffee infusion.

If the coffee machine is provided with several dispensing units 4 of the coffee infusion, there are provided just as many preheaters 30 in boiler 12, even if for simplicity, reference is made in the present description to one dispensing unit 4 alone and to one preheater 30 alone.

In greater detail, the dispensing unit 4 of the coffee infusion comprises a heater 31 consisting of a metal body 32 preferably having features both of a low heat transmission coefficient and high specific heat (e.g. OT58), which is constrained to a flat portion of frame 2 of the coffee machine by means of two blocks 34 made of thermal insulating material, preferably of synthetic type having features both of a low heat transmission coefficient and a high mechanical resistance (e.g. PVDF).

In particular, as depicted in FIG. 3, each block 34 is fastened to frame 2 of the coffee machine with screws 36 which cross a metal plate 38 and block 34 before being engaged in frame 2, and it is also fastened to unit 4 with other screws 40, which cross a different metal plate 42 and block 34 before being engaged in body 32 of the dispensing unit 4. Advantageously, all direct metal connections between the dispensing unit 4 and frame 2 of the machine thereby are eliminated, and therefore the related heat bridge between the two.

In particular, a conduit is formed in body 32, for the water from preheater 30 and intended to reach the chamber in which the coffee blend is contained. A traditional filter holder 46 provided with one or more dispensing and outlet spouts 48 of the coffee infusion conveniently is applied to such a chamber.

An electrical resistance 44 is embedded in the body 32 of heater 31, which resistance allows to heat up the body itself, and therefore also the water which flows in the conduit defined in said body and coming from preheater 30. A temperature sensor 50 connected to the control unit which supplies the electrical resistance 44 and a solenoid valve 52 which can be actuated by the operator or by the control unit conveniently is arranged in the conduit inside the body 32 of the heater 31 of unit 4.

The hot water dispenser 8 for preparing the tea infusion is connected to the outlet of exchanger 28 through a solenoid valve 54 or through a tap which can be actuated manually by the operator.

As said, the dispenser 6 of pressurized steam is connected to the outlet 16 of boiler 12 through the solenoid valve 18 and a flow regulator 20.

In particular, as depicted in FIGS. 4 and 5, this flow regulator 20 comprises a body 56 having an inner cylindrical cavity 58 which communicates upstream with the outlet of the solenoid valve 18 and downstream with the steam dispensing spout 60.

There may be provided a cylindrical rod 62 in cavity 58, provided with an end portion equipped with a worm screw gear 64, which is engaged in a graduated actuation wheel 66, which may rotate with respect to body 56 but is prevented from performing axial movements because it is engaged by a fork-shaped element 67 fastened to body 56 itself.

The rotation of rod 62 is prevented by a fork 71 fastened integrally thereto and slidingly constrained to body 56 so as to allow only axial movements of the rod itself.

Rod 62 has a reduced-section portion 68, which following its axial movements induced by the rotation of wheel 66, more or less obstructs the communication between conduit 73 associated with the solenoid valve 18 and the conduit 75 defined in spout 60.

A pair of O-rings 70 ensures the seal between cavity 58 and the outside for any axial position of rod 62.

The operation of the coffee machine according to the invention is as follows:

under stand-by condition (i.e during the rest position in which the preparation is not required of any beverage), the temperature of the water in the tank 11 of boiler 12 is adjusted to a higher value than that of traditional coffee machines (which generally is equal to about 122° C.) and practically is from 122° C. to 130° C., and preferably is equal to or greater than about 128° C., and is balanced with the steam in the upper part of tank 11. In particular, as shown in the diagram by Mollier, the pressure of the water in the tank 11 of boiler 12 is adjusted to a higher value than that of traditional coffee machines (which generally is equal to about 1.2 bar) and practically is from 1.2 bar to 1.8 bar, and preferably is equal to or greater than about 1.6 bar.

Advantageously, this allows to ensure an increased production of high pressure and high flow steam, and more particularly allows to obtain a coffee machine which practically can be used in all markets, and in particular in the markets where the preparation, for example for heating and/or frothing, of increased daily quantities of milk (over 200 liters of milk a day) is required.

The temperature of the water in the tank 11 of boiler 12 conveniently is controlled by a probe, which acts on a control unit (not depicted), which in turn acts on the electrical resistance 22 in a traditional manner.

Preheater 30 of the water intended to prepare the coffee infusion is sized so that at those temperature conditions of the water of boiler 12, the water intended to then supply the dispensing unit 4 reaches a first temperature $T_1$, for example from 60° C. to 70° C., preferably of about 65° C., which is lower than a second temperature $T_2$ which corresponds to the optimal one for the preparation of a specific coffee infusion. In other terms, by crossing the heat exchanger of preheater 30, the cold supply water is heated up to reaching a first temperature $T_1$ by absorbing the heat which is transferred from the water in the tank 11 of boiler 12 and which acts as a heat-carrying fluid.

Heater 31 of the dispensing unit 4, and in particular resistance 44 thereof, is controlled so as to ensure that the water contained therein reaches said second temperature $T_2$, i.e. the optimal temperature for the preparation of the coffee infusion, which generally is from 70° C. to 95° C., preferably of about 82-85° C.

Conveniently, the heat exchanger of heater 28 of the water intended to prepare the tea infusion is sized so that at those operating conditions of boiler 12, the water reaches a third temperature $T_3$, which is suitable for preparing the tea infusion, i.e. at a temperature of about 70° C.-90° C.

Conveniently, if for example the frothing of the milk is required for the preparation of a cappuccino, or in any case milk requires heating, the operator will actuate the solenoid valve 18 so that the pressurized steam in the tank 11 of boiler 12 is released through dispenser 6, thus creating a steam flow for heating and possibly frothing the milk. If a different pressure of the steam is required, the operator may act on the graduated wheel 66 and thereby adjust the pressure of the steam which is released from the dispenser to set it to the value desired, which will then remain constant each time the solenoid valve 18 is actuated and up to new adjustments by means of the wheel itself.

It is worth noting that even if increased quantities of steam for heating/frothing increased quantities of milk are taken from boiler 12, the quantity of hot water corresponding to these increased quantities of steam is rather low and the quantity of cold water which is to be introduced into the tank 11 of boiler 12 for restoring the water released in the form of steam is equally as low. Advantageously, this ensures maintaining a significantly constant temperature of the water inside the boiler itself.

If the preparation of a coffee infusion is required, the operator actuates the solenoid valve 52, which induces the release of water pushed by a traditional electrical pump (not depicted) towards the coffee powder at the optimal temperature (which corresponds to the second temperature $T_2$) required by the operator for that specific type of coffee so as to cause the desired infusion to be released from spout 48.

Since the preheater 30 is sized so as to provide the water release at a temperature $T_1$ which corresponds or is close to the optimal temperature $T_2$ for the preparation of the coffee infusion, it is apparent that the significantly constant temperature of the water of boiler 12 ensures an increased constancy in temperature of the water which is released from preheater 30, and therefore just as increased a constancy in temperature of the water with which the coffee infusion is prepared.

But even if temperature $T_1$ of the water which is released from preheater 30 undergoes small variations related to small variations of the water inside boiler 12, the heater 31 provided inside the body 32 of the dispensing unit 4 would quickly take the temperature of the water back to the optimal value $T_2$ given the low thermal inertia of the unit itself and the increased sensitivity thereof to the heat regulation system.

If the preparation of a tea infusion is required, the operator actuates the solenoid valve 54 to induce the release of water through dispenser 8 at the optimal temperature $T_3$ for this function.

From the above description, the professional coffee machine according to the present invention is much more advantageous than traditional coffee machines because:
  due to the use of water which is heated by the boiler water by means of heat exchangers, its phenomenon of abrupt temperature lowering is avoided each time new cold water enters the boiler to replace that which is released in the form of pressurized steam for heating/frothing the milk;
  due to a boiler operating under temperature and pressure conditions which are fixed and no longer bound to the different parameters required for the preparation of various quantities and preparation methods of frothed milk, water preheated to a fixed temperature close to that used for the preparation of the coffee infusion may be used;
  due to the heating of the water for the preparation of the coffee infusion in two steps, with a preheating in the boiler to take the water to a temperature close to that of use, and with a final heating in the coffee dispensing unit, and due to the low thermal inertia thereof, there is a very quick response to the heat regulation system;
  due to the particular system for constraining the coffee dispensing unit 4 to the coffee machine frame, increased heat insulation features of the unit itself are combined with an increased resistance to the inevitable mechanical stresses to which it is subjected during the operations of applying and removing the filter holder;
  due to the heating of the water for preparing the tea infusion by means of exchanger, the machine has hot water available at the optimal temperature even with a boiler temperature which is higher than habitual ones, which does not allow the direct use of the boiler water for the preparation of the tea infusion;
  due to the fine adjustability of the steam flow, the machine allows to have thermal energy in sufficient quantity to heat significant quantities of milk on the one hand, and on the other hand to use the low pressure steam for frothing limited quantities of milk, when required.

In particular, the machine according to the present invention is different from EP 1886605 because the latter:
  does not have a boiler, and in particular does not have a boiler which comprises a tank which receives and heats the supply water,
  does not have a preheater which is configured to heat the water provided for the preparation of the coffee infusion to a first temperature $T_1$ which corresponds or is close to a second temperature $T_2$ which is the optimal one for that specific type of coffee,
  does not have a preheater of the water for the preparation of the coffee infusion which comprises a first heat exchanger which is associated with the boiler so that the water contained in said boiler acts as a heat-carrying fluid and transfers heat, by heat exchange, to the supply water which crosses the preheater itself,
  does not have a heater of the water provided for the preparation of a tea infusion or the like, which comprises a second heat exchanger which is associated with said boiler so that the water contained in said boiler acts as a heat-carrying fluid and transfers heat, by heat exchange, to the supply water which crosses the preheater itself, contrarily, the hot water for the preparation of a tea infusion or the like in EP 1886605 indeed is obtained by mixing/hitting the cold supply water with a hot flow of steam,
  does not have the heating element of the coffee dispensing unit constrained to the machine frame by means of thermal insulating means.

Furthermore, the machine according to the present invention is different from EP 2133011 because in addition to not including any heater or dispenser of hot water for the preparation of a tea infusion or the like, the latter does not have a preheater of the water for the preparation of the coffee infusion which comprises a first heat exchanger which is associated with the boiler so that the water contained in said boiler acts as a heat-carrying fluid and transfers heat, by heat exchange, to the supply water which crosses the preheater itself. Moreover, the machine according to EP2133011 does not have the heater of the coffee dispensing unit constrained to the machine frame by means of thermal insulating means.

Furthermore, the machine according to the present invention is different from WO 2011/145064 because in addition to not having any heater or dispenser of hot water for the preparation of a tea infusion or the like, the latter:
  is not a professional machine, rather is a household machine,
  does not have, in sequence, a preheater which is associated with the boiler and is configured to heat the water to a first temperature $T_1$, and a heater which is associated with the dispensing unit of the coffee infusion and is configured to heat the water from said first temperature $T_1$ to a second temperature $T_2$ which is the optimal one for that specific type of coffee,
  does not need the supply water crossing the preheater to be heated by the water in the boiler by means of heat exchange,
  does not need the coffee dispensing unit to comprise a heater and to be constrained to the machine frame by means of thermal insulating means.

In essence, while the aforesaid traditional machines directly use and heat the water for the preparation of the coffee and tea infusion, the professional machine according to the present invention uses the water which is accumulated and heated in the tank of the boiler as a heat-carrying fluid for in turn heating the water to be used for the preparation of the coffee infusion and the water to be used for the preparation of the tea infusion or the like, by means of two separate heat exchangers. In other terms, in the present invention, the water of the boiler transfers heat to the water which circulates in such a first exchanger by means of a first heat exchanger, thus inducing the heating of the latter to a first temperature $T_1$ which is close (i.e. slightly less) or equal to a second temperature $T_2$, which instead is the optimal one for the preparation of that specific coffee infusion. Moreover, by means of a second heat exchanger which is independent from the first, the water of the boiler transfers heat to the water which circulates in such a second exchanger, thus inducing the heating of the latter to a third temperature $T_3$ which is the optimal one for the preparation of the tea infusion or the like. Such a configuration is particularly advantageous because it allows to obtain a fine-tuned and quick adjustment of the temperature of the water to be used for both the coffee infusion and the preparation of the tea infusion or the like.

The invention claimed is:

1. A professional coffee machine comprising:
a supporting frame (2);
a boiler (12) mounted to said supporting frame and comprising a tank (11), which is supplied with water and which is provided with a heater;
at least one preheater (30) for preparation of a coffee infusion, comprising a first heat exchanger, which is associated to said boiler (12) so that the water contained and heated in said boiler heats, by heat exchange, supply water which crosses said first heat exchanger to a first temperature $T_1$, said first temperature $T_1$ being lower or substantially equal to a second temperature $T_2$ which corresponds to a desired temperature to prepare the coffee infusion;
a dispensing unit (4) of the coffee infusion, provided with a thermo-controlled heating element (44), which is configured to bring the water released from said preheater (30) to said second temperature $T_2$ if said first temperature $T_1$ is lower than said second temperature $T_2$;
a thermal insulating member (34) that mechanically constrains said dispensing unit (4) to said supporting frame (2) of the coffee machine;
a heater (28) for preparation of a tea infusion, comprising a second heat exchanger associated to said boiler (12) so that the water contained and heated in said boiler (12) heats, by heat exchange, supply water which crosses said second heat exchanger up to a third temperature $T_3$, said third temperature $T_3$ corresponding to desired temperature to prepare the tea infusion; and
a dispenser (8) of hot water to prepare the tea infusion, connected to said second heat exchanger of said heater (28) with a conduit provided with an intercepting member (62) of water flow heated to said third temperature $T_3$.

2. The professional coffee machine according to claim 1, wherein said boiler (12) is configured to generate pressurized steam in the tank (11) of said boiler (12), and wherein said professional coffee machine comprises a dispenser (6) of the pressurized steam generated in the tank (11) of said boiler (12).

3. The professional coffee machine according to claim 1, wherein the tank of said boiler (12) is of at least 8 liters and said boiler (12) is configured for thermo-controlled production of pressurized steam.

4. The professional coffee machine according to claim 1, wherein the water inside the tank (11) of said boiler (12) is adjusted to a temperature of about 122-130° C.

5. The professional coffee machine according to claim 1, wherein said first heat exchanger of said preheater (30) is sized to generate water at said first temperature $T_1$ from 60° C. to 70° C. when the water in said boiler (12) is at a temperature of about 122° C.-130° C.

6. The professional coffee machine according to claim 1, wherein said thermo-controlled heating element (44) of said dispensing unit (4) is configured to ensure that the water from said preheater (30) reaches or maintains said second temperature $T_2$, which is from 70° C. to 95° C.

7. The professional coffee machine according to claim 1, wherein said dispensing unit (4) comprises a third heat exchanger connected, at an input, to said preheater (4) and, at an output, to a filter holder (46) provided with at least one dispensing spout (48) of the coffee infusion.

8. The professional coffee machine according to claim 7, wherein said dispensing unit (4) comprises a metal body (32) made of a material with a low heat transmission coefficient and a high specific heat.

9. The professional coffee machine according to claim 8, wherein a water passage conduit for passage of the water from said preheater (30) and reaching said filter holder (46) is obtained in said metal body (32), and an electrical resistance (44) for heating said water is embedded in said metal body, said electrical resistance having a control unit controlling a temperature sensor (50) arranged in said water passage conduit, downstream of said temperature sensor (50), there being provided a solenoid valve (52) actuated by an operator or by said control unit.

10. The professional coffee machine according to claim 1, wherein said dispensing unit (4) is mechanically constrained to said supporting frame (2) through blocks (34) of a synthetic material having a low heat transmission coefficient and a high mechanical resistance, said dispensing unit (4) and said supporting frame (2) being independently constrained to said blocks (34).

11. The professional coffee machine according to claim 1, wherein said second heat exchanger (28) is sized to generate hot water at a third temperature $T_3$ of about 70° C.-90° C. when the water in said boiler (12) is at a temperature of about 122° C.-130° C.

12. The professional coffee machine according to claim 2, wherein said dispenser (6) of pressurized steam is connected to the tank (11) of said boiler (12) with a conduit (16) provided with a second intercepting member (18) and an adjusting member (20) of steam flow.

13. The professional coffee machine according to claim 12, wherein said adjusting member (20) of the steam flow comprises a body (56) having an inner cylindrical cavity (58) communicating upstream with said second intercepting member (18) and downstream with a spout (60) for dispensing the steam, a shutter (62) which controls passage of the steam flow by way of its axial position being axially movable in said cavity.

14. The professional coffee machine according to claim 13, wherein said shutter (62) consists of a single rod associated, due to an axial movements of the rod, with a graduated wheel (66).

15. The professional coffee machine according to claim 14, wherein said rod (62) is cylindrical and has a reduced-section portion (68) which controls the passage of the steam flow through said body with the axial position of said rod (62).

16. The professional coffee machine according to claim 1, wherein said boiler (12) is mounted to said supporting frame (2) with a thermal insulating and constraining element.

* * * * *